US007269912B2

United States Patent
Muday et al.

(10) Patent No.: US 7,269,912 B2
(45) Date of Patent: Sep. 18, 2007

(54) METHODS AND APPARATUSES FOR MOUNTING A FLAT PANEL VIDEO DISPLAY

(75) Inventors: Tom Muday, Scottsdale, AZ (US); Zachary Eyman, Phoenix, AZ (US); Korry Hoglan, Phoenix, AZ (US); Dave Anderson, Mesa, AZ (US); Steve Singleton, Scottsdale, AZ (US); Brett Stenhouse, Phoenix, AZ (US)

(73) Assignee: Omnimount Systems, Inc., Phoenix, AZ (US)

( * ) Notice: Subject to any disclaimer, the term of this patent is extended or adjusted under 35 U.S.C. 154(b) by 0 days.

(21) Appl. No.: 11/073,314

(22) Filed: Mar. 4, 2005

(65) Prior Publication Data

US 2005/0210695 A1    Sep. 29, 2005

Related U.S. Application Data

(60) Provisional application No. 60/550,992, filed on Mar. 5, 2004.

(51) Int. Cl.
*G01B 5/24* (2006.01)
(52) U.S. Cl. .......................................... 33/613; 33/562
(58) Field of Classification Search .................. 33/562, 33/563, 613, 645
See application file for complete search history.

(56) References Cited

U.S. PATENT DOCUMENTS

| 4,008,522 | A | * | 2/1977 | Anderson ...................... 33/44 |
| 4,437,839 | A | * | 3/1984 | Stempel ...................... 434/417 |
| 4,443,949 | A | * | 4/1984 | Newton ........................ 33/613 |
| 4,506,790 | A | * | 3/1985 | Muscari ....................... 248/174 |
| 4,863,399 | A | * | 9/1989 | Medlin, Jr. ................ 248/27.1 |
| 5,557,996 | A | * | 9/1996 | Reber et al. .................. 33/563 |
| 6,024,333 | A | * | 2/2000 | Raasch et al. .............. 248/247 |
| 6,219,930 | B1 | * | 4/2001 | Reid ............................ 33/562 |
| 6,449,863 | B1 | * | 9/2002 | Voorhees ..................... 33/613 |
| 6,463,668 | B1 | * | 10/2002 | Williams ...................... 33/528 |
| 6,618,955 | B2 | * | 9/2003 | Rice ............................ 33/613 |
| D517,085 | S | * | 3/2006 | Deuschle ................... D14/451 |
| 2004/0205975 | A1 | * | 10/2004 | Brady ........................ 33/562 |
| 2005/0110911 | A1 | * | 5/2005 | Childrey et al. ......... 248/475.1 |

* cited by examiner

*Primary Examiner*—G. Bradley Bennett
(74) *Attorney, Agent, or Firm*—Hogan & Hartson LLP (57) ABSTRACT

Mounting tools and methods for using mounting tools are disclosed herein. In one embodiment, a mounting tool includes a template having a body configured to be releasably attachable to a support medium. The mounting tool further includes a projecting member configured to interface with the body. The projecting member is movable to project at an angle from the body for catching particulates. The projecting member can have several different configurations. For example, the projecting member can be integral with the body. Alternatively, the projecting member can be a discrete component with respect to the body.

36 Claims, 7 Drawing Sheets

METHODS AND APPARATUSES FOR MOUNTING A FLAT PANEL VIDEO DISPLAY

CROSS-REFERENCE TO RELATED APPLICATION

The present application claims priority to U.S. Provisional Application No. 60/550,992 filed Mar. 5, 2004 and incorporated herein in its entirety by reference.

TECHNICAL FIELD

The present invention is related to methods and apparatuses for mounting a video display to a wall or other structure. More particularly, several embodiments of the invention are directed to mounting tools and methods for using such mounting tools to install mounting devices for flat panel video displays.

BACKGROUND

Flat panel video displays, such as plasma televisions, LCD displays and the like, are becoming very popular. As a result, flat panel displays are used in a wide variety of viewing areas from family rooms to boardrooms. Many manufacturers are accordingly entering into this segment of the market with many different models of video displays that have different shapes and sizes. As such, there is also a vast array of different mounting devices and mounting techniques to secure flat panel video displays to walls or other structures.

Flat panel video displays are generally secured to a structure using floor stands, wall mounts, and/or ceiling brackets. Most traditional wall mounts require an installer to first locate and mark center locations for the studs closest to the desired video display placement area. Next, the installer determines the desired height for the display and levels an upper and/or lower edge of a mounting bracket. Based on the location of the studs and the marked edges of the mounting bracket, the installer marks and drills pilot holes into the wall. The installer then attaches the mounting bracket to the wall using lag bolts inserted into the pilot holes. After securing the mounting bracket to the wall, the installer attaches the video display to the mounting bracket.

Installing mounting brackets as described above is arduous and time-consuming. First, the mounting bracket must be securely attached to the structure to prevent inadvertent movement of the video display. To do this, the mounting bracket must be attached to studs because larger flat panel video displays can be quite heavy. If the mounting bracket is not installed properly, the video display could fall and be seriously damaged or injure someone. Second, the mounting bracket must be level or otherwise properly aligned for a professional installation. Therefore, there is a need to ensure that the mounting bracket is secured to studs in the wall in a desired position.

Installing mounting brackets is also messy because a number of holes are drilled into the wall. The dust and/or debris from the wall can contaminate and/or damage the area surrounding the mounting location. The cleanup after installation can also be time-consuming, and many installers may not clean up after installing a display. Accordingly, there is a need to improve the precision and efficiency of installing mounting brackets.

In addition to the difficulties associated with installation of the mounting brackets, another problem with conventional wall mounting techniques is that different models of flat panel video displays have different patterns of mounting holes and/or different mounting hardware. Thus, conventional mounting brackets are generally tailored for use with a specific model or brand of video displays.

DETAILED DESCRIPTION

A. Overview

The following disclosure describes several embodiments of mounting tools and methods for using such mounting tools to install brackets or other mounting devices for holding flat panel video displays. Many specific details of certain embodiments of the invention are set forth in the following description and in FIGS. 1A-5 to provide a thorough understanding of such embodiments. One skilled in the art, however, will recognize that the invention can be practiced without one or more of the specific details explained in the following description. Moreover, although the following disclosure sets forth several embodiments of different aspects of the invention, several other embodiments of the invention can have different configurations or different components than those described in this section. As such, it should be understood that the invention may have other embodiments with additional elements or without several of the elements shown and described below with reference to FIGS. 1A-5.

Several aspects of the invention are directed to mounting tools. One embodiment of a mounting tool in accordance with the invention includes a template having a body configured to be releasably attachable to a support medium. The mounting tool further includes a projecting member configured to interface with the body. The projecting member is movable to project at an angle from the body for catching particulates. The projecting member can have several different configurations. For example, the projecting member can be integral with the body or it can be a discrete component separate from the body.

Another aspect of the invention is directed to a system for mounting a video display. The system comprises a mounting tool including a template having a body configured to be releasably attachable to a support medium. The template further includes a projecting member configured to interface with the body for catching particulates. The system further includes a mounting bracket for releasably supporting a video display on the support medium. In one embodiment, the mounting tool is an integral component of the packaging of the mounting bracket. In further embodiments, however, the mounting tool is separate from the package containing the mounting bracket.

A further aspect of the invention is directed to methods of installing a mounting device for supporting a video display. One embodiment of such a method includes releasably attaching a body of a mounting tool to a desired location on a support medium such that at least a portion of the body is aligned with a stud in the support medium. The method also includes drilling mounting holes for a mounting device in the support medium aligned with corresponding portions of the template. The method further includes collecting particulates in a projecting member of the mounting tool that projects from the body while drilling the mounting holes.

Figure 1A:
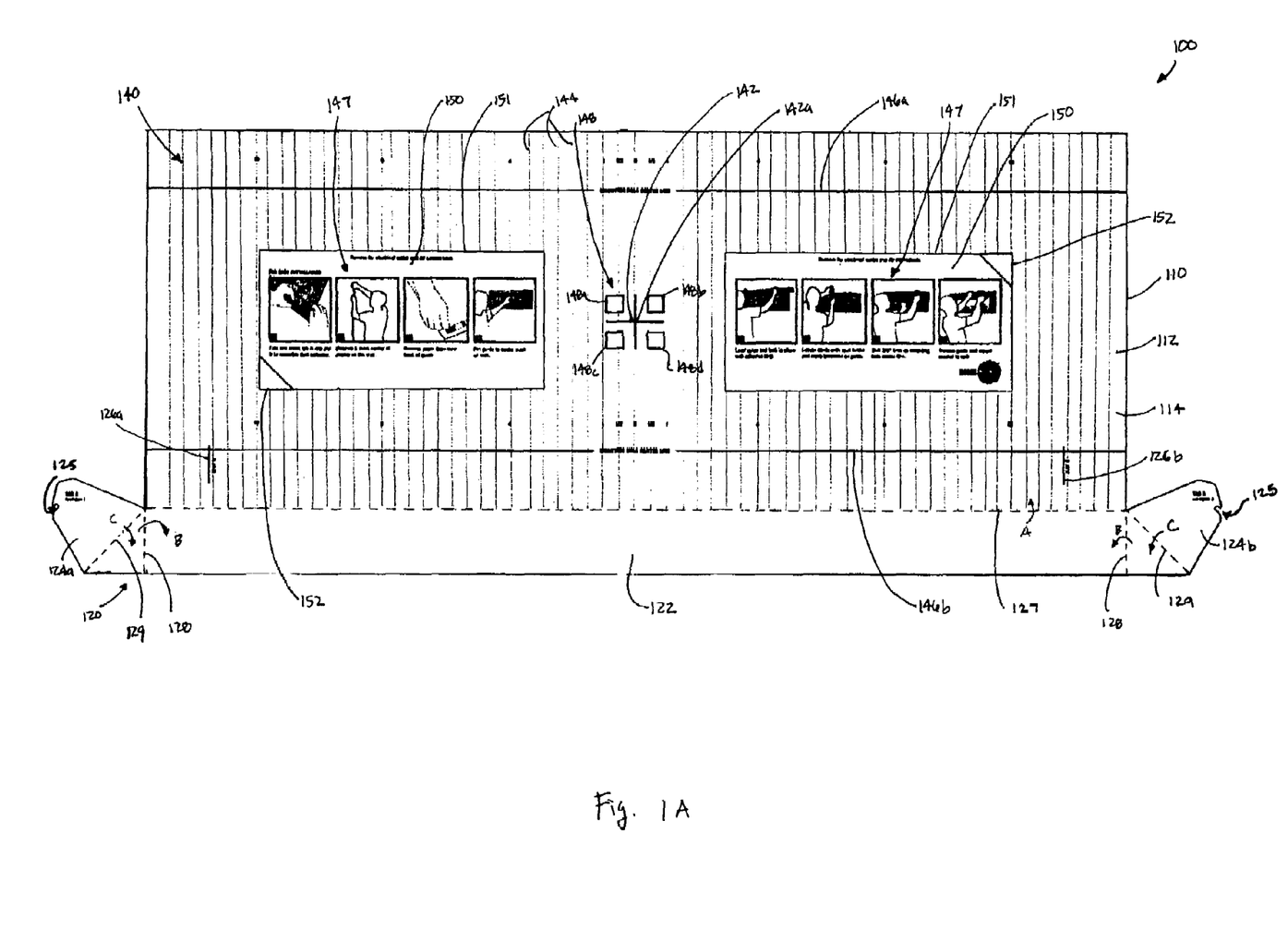
FIG. 1A is a top view of a mounting tool in accordance with one embodiment of the invention.
Figure 1B:
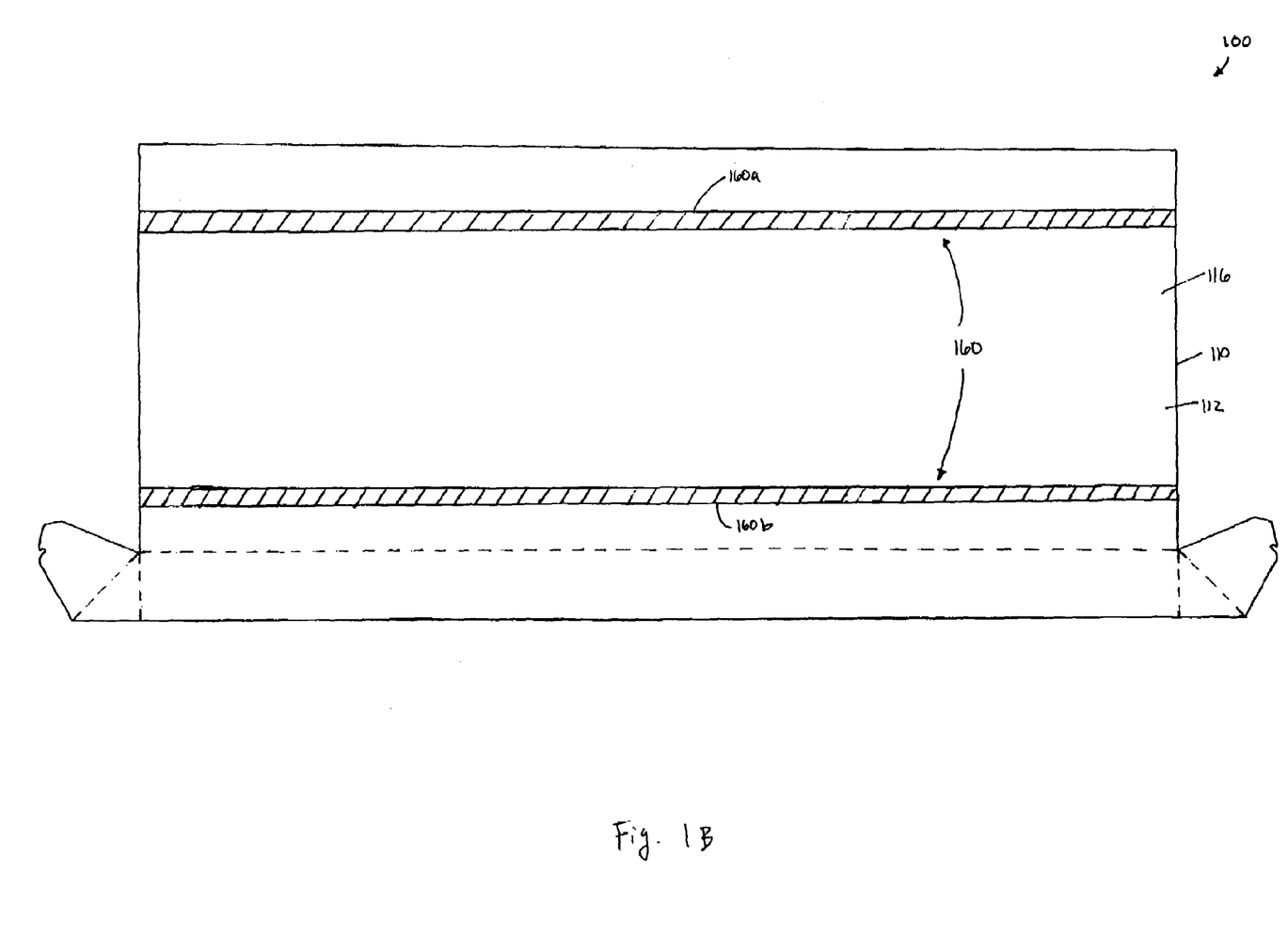
FIG. 1B is a bottom view of the mounting tool of FIG. 1A.

B. Embodiments of Mounting Tools for Installing Mounting Devices for Supporting Flat Panel Video Displays FIGS. 1A and 1B are top and bottom views, respectively, of a mounting tool 100 in accordance with one embodiment of the invention. Referring to FIGS. 1A and 1B together, the mounting tool 100 includes a template 110 having a thin body 112 with a front side 114 (FIG. 1A) and a backside 116 (FIG. 1B). In the illustrated embodiment, the body 112 of the mounting tool 100 is a generally planar piece of cardboard, plastic or other suitable material. The body 112 is generally sized to correspond with the dimensions of a mounting device (not shown) used to support a flat panel video display (not shown).

The body 112 in the illustrated embodiment is sized to correspond with a U3 universal tilt plasma mount, commercially available from OmniMount Systems of Phoenix, Ariz. The U3 universal tilt plasma mount, in conjunction with a variety of adapter plates also commercially available from OmniMount Systems, will work with most flat screen video displays presently on the market. One advantage of this feature is that the same mounting device and the same mounting tool 100 can be used regardless of the size or model of the video display. The body 112 of the mounting tool 100 may have different configurations in other embodiments. For example, the body 112 can be sized to correspond to a different mounting device, or the body 112 may be sized such that it corresponds to a number of different mounting devices.

The template 110 shown in FIG. 1A further includes a projecting member 120 having a tray portion 122 and a set of tabs 124a and 124b. The template 110 also has a set of corresponding slots 126a and 126b that receive tabs 124a and 124b respectively. The tabs 124a and 124b are inserted into the slots 126a and 126b such that the tray portion 122 projects relative to the body 112. In operation, the tray portion 122 collects particulates (e.g., dust and other small debris) generated by installing the mounting device as explained in more detail below.

The template 110 also includes alignment indicia 140 at the front side 114 of the body 112 to accurately align the mounting tool 100 with respect to a support medium before positioning and installing the mounting device (not shown). The support medium is typically a wall, but it can be posts or other suitable surfaces to which a flat panel video display can be mounted. In the illustrated embodiment, the alignment indicia 140 includes a center mark 142, a plurality of stud locator lines 144, mounting hole lines 146a and 146b, and instructions 147 for using the mounting tool 100. In other embodiments, the template 110 may include additional indicia or certain indicia mentioned above may not be included. The center mark 142 is positioned at the center of the mounting tool 100 and includes a small hole 142a where a thumbtack, nail, or the like can be placed to temporarily hold the mounting tool 100 at a desired location on the support medium for attaching the mounting device (not shown).

The illustrated embodiment of the stud locator lines 144 on the template 110 are an array of parallel vertical lines. The locator lines 144, for example, can indicate one-half inch increments on either side of the center mark 142 (i.e., the "zero" point). The lines 144 are used to align the mounting tool 100 with studs in the support medium, as described below with respect to FIG. 2. The lines 144 can be marked with a "0" at the centerline of the template, and with a "4," "8," and/or "12" on each side of the centerline, respectively, to provide a guide for sixteen inch or twenty-four inch stud spacing. In other embodiments, the stud locator lines 144 can have other configurations or the template 110 may not include stud locator lines 144.

The illustrated embodiment of the mounting hole lines 146a and 146b are parallel horizontal lines extending across the template 110 from left to right. The mounting hole lines 146a and 146b are generally spaced apart from each other by a desired vertical distance between holes for attaching the mounting device (not shown) to a structure. The mounting hole lines 146a and 146b are used to align a plurality of holes to be drilled into the support medium and subsequently used to install the mounting device (not shown) on the support medium. In alternative embodiments, the mounting hole lines 146a and 146b can have different configurations.

The template 110 further includes a plurality of view holes 148 (e.g., the illustrated embodiment includes four view holes 148a-d) proximate to the center mark 142. Without the view holes 148a-d, the body 112 obscures marks on the support medium that identify where the center mark 142 should be located. The view holes 148a-d allow an installer to more easily align the center mark 142 with the mounting location. The view holes 148a-d can be formed by stamping the template 110 at a desired location to remove a portion of the body 112. In other embodiments, the view holes 148 are formed using different methods known to those of skill in the art. Moreover, the template 110 can have a different number of view holes 148 and/or configurations, or the template 110 may not include any view holes 148.

The template 110 further includes a set of removable portions 150 corresponding to areas on the support medium where the electrical and audio-visual connections (i.e., "J-boxes") for the flat panel video display will be located. The removable portions 150 include notches 152 to allow the installer to insert a cutting tool (e.g., knife or scissors) to cut out the removable portions 150. The desired J-box locations can then be marked on the support medium using the perimeter 151 surrounding the removable portions 150 as a guide.

Referring to FIG. 1B, the mounting tool 100 further includes an adhesive portion 160 at the backside 116 of the body 112 of the template 110. The adhesive portion 160 is used to temporarily attach the mounting tool 100 to the support medium during the installation process. This feature ensures that the mounting tool 100 does not inadvertently move or shift on the support medium. Also, it eliminates the need for the installer to manually tape or glue the mounting tool 100 to the support medium. In the illustrated embodiment, the adhesive portion 160 includes two strips 160a and 160b of adhesive material covered with a non-stick paper material. In other embodiments, however, the adhesive portion 160 on the mounting tool 100 can have different configurations and/or include different materials.

Figure 1C:
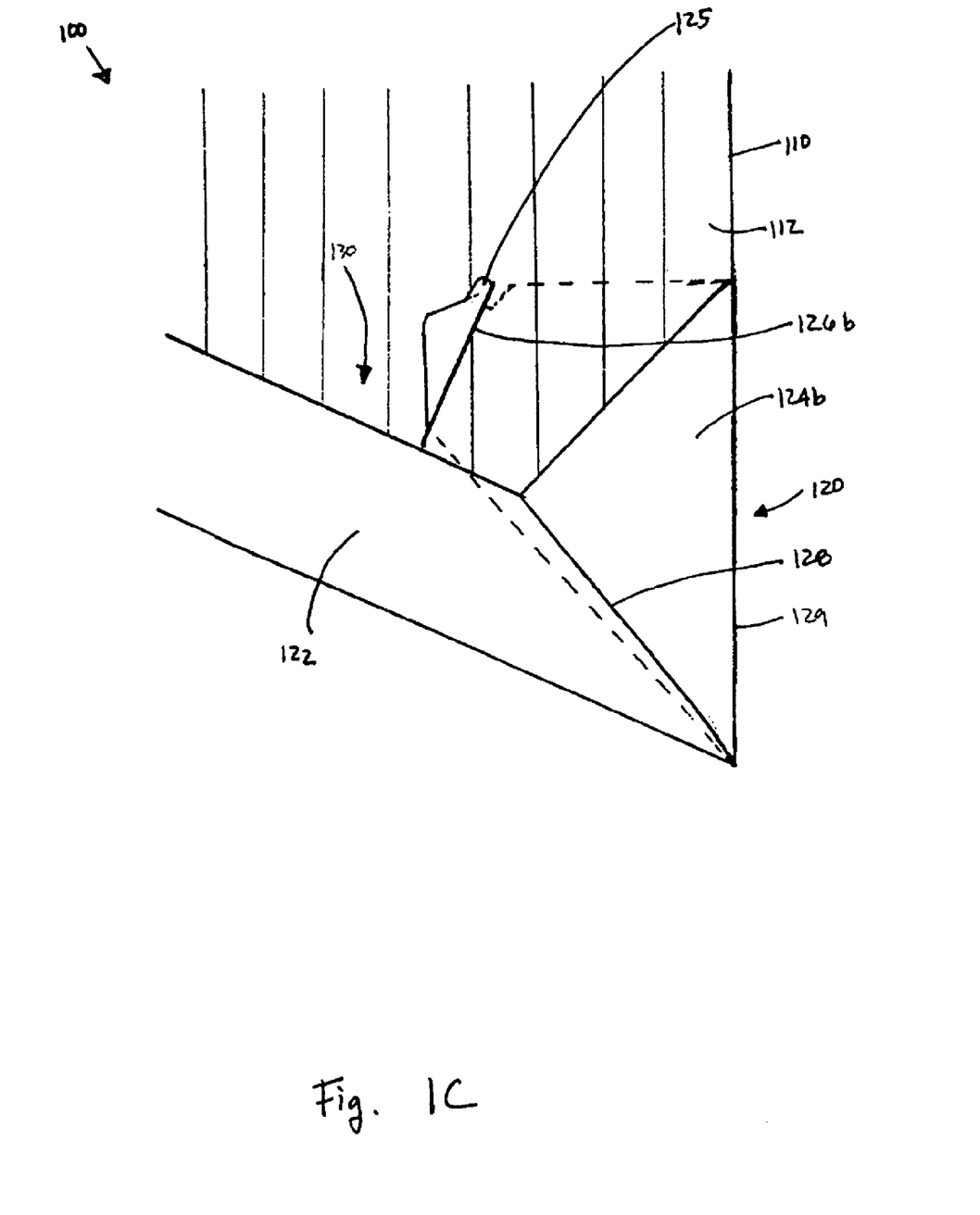
FIG. 1C is an isometric view of a portion of an assembled projecting member of the mounting tool of FIG. 1A.

FIG. 1C is an exploded isometric view of a portion of an assembled projecting member 120 of the mounting tool 100 of FIG. 1A. Referring to FIGS. 1A and 1C together, the projecting member 120 is assembled by folding the template 110 along perforated lines 127, 128, and 129, respectively (arrows A, B, and C indicate the direction of the folds). Next, the tabs 124a and 124b are inserted into the corresponding slots 126a and 126b such that a notched portion 125 of the tabs 124a and 124b is secured within the slots 126a and 126b. When the tabs 124a and 124b are secured within the slots 126a and 126b, the tray portion 122 projects from the body 112 forming a receptacle 130 that catches particulates and/or debris generated during the installation process. In other embodiments, such as those described below with reference to FIGS. 4A and 4B, the projecting member 120 can have other configurations without tabs and/or slots. Furthermore, the projecting member 120 can also be a discrete component separate from the body 112 that is subsequently attached to the body 112.

Figure 2:
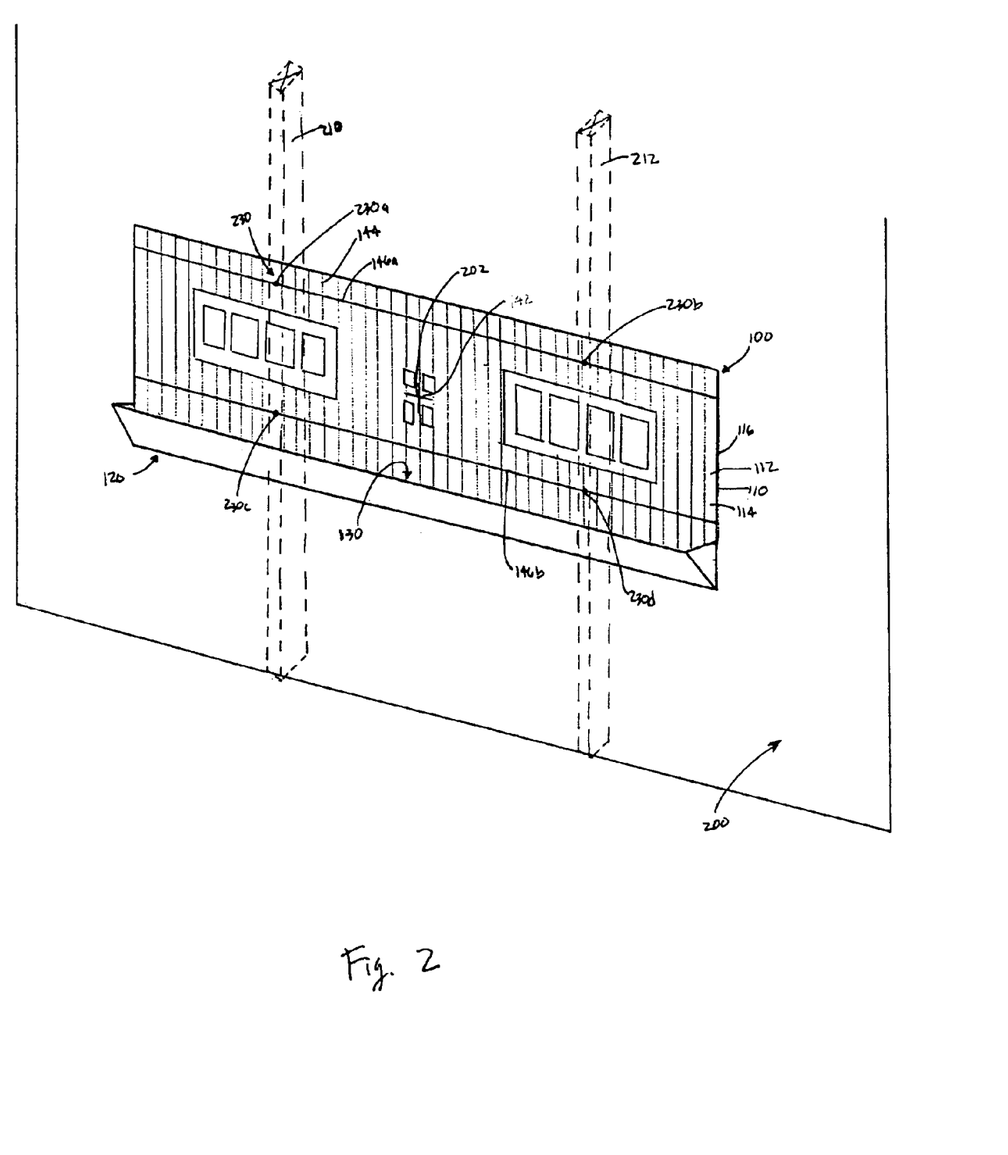
FIG. 2 is an isometric view of a mounting tool positioned at a desired location on a support medium in accordance with an embodiment of the invention.
Figure 3:
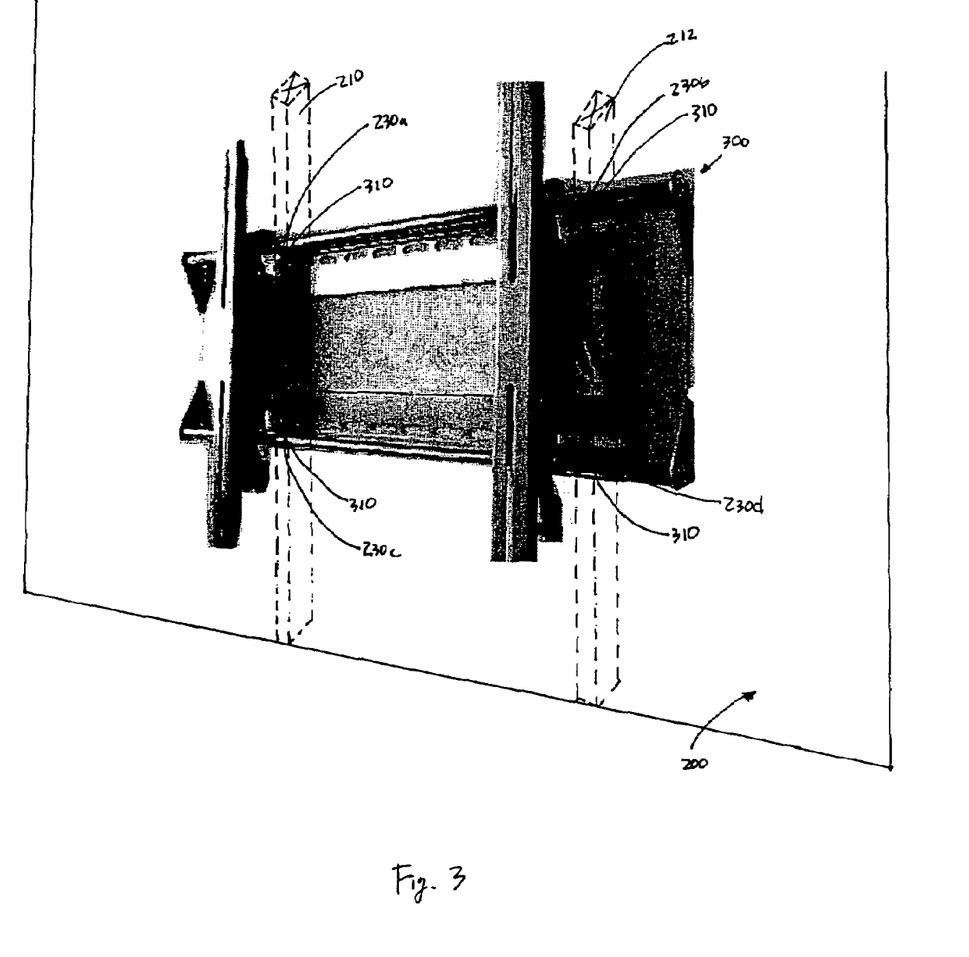
FIG. 3 is an isometric view of a mounting device for supporting a flat panel video display installed at a desired location.

C. Methods of Using a Mounting Tool to Install a Mounting Device for a Flat Panel Video Display FIGS. 2 and 3 illustrate stages in a method of installing a mounting device for supporting a flat panel video display using the mounting tool 100 (FIGS. 1A-1C) in accordance with an embodiment of the invention; like reference numbers accordingly refer to like components in FIGS. 1A-3. FIG. 2, more specifically, is an isometric view of the mounting tool 100 positioned at a desired location on a wall 200. The projecting member 120 has been moved from a first position generally planar with the body 112 to a second position where the projecting member 120 projects transversely from the body 112 to form a receptacle 130 for catching particulates and/or small debris. The paper backing on the adhesive portion 160 (not shown) at the backside 116 of the template 110 has been removed and the center mark 142 of the mounting tool 100 is aligned with a predetermined mounting location 202 on the wall 200. A thumbtack (not shown) is inserted through the center mark 142 of the mounting tool 100 and into the mounting location 202 on the wall 200 to temporarily hold the mounting tool 100 at the desired location.

The mounting tool 100 shown in FIG. 2 is also level with respect to the floor and the wall. The mounting tool 100 is leveled by placing a level (not shown) on one of the mounting hole lines 146a or 146b and rotating the mounting tool 100 either clockwise or counterclockwise about the center mark 142 until the level indicates that the mounting hole lines 146a or 146b are horizontal or otherwise properly positioned. The installer gently applies pressure to various portions of the front side 114 of the template 110 such that the adhesive portions 160 (not shown) at the backside 116 of the template 110 releasably adhere to the wall 200.

The installer next uses a stud finder (not shown) to locate a first stud 210 (shown using hidden lines) in the wall 200. After finding the first stud 210, the stud locator lines 144 on the mounting tool 100 are used as a general guide for locating the second stud 212 (shown using hidden lines) in the wall 200. For example, if the first stud 210 is located at the stud locator line 144 marked "8" on the left side of the template 110 (i.e., eight inches left of the center mark 142), and if the studs 210 and 212 are sixteen inches apart, then the center of the second stud 212 should be located at the stud locator line marked "8" on the right side of the template 110 (i.e., eight inches right of the center mark 142). The actual center of the second stud 212 is quickly found using a stud finder in conjunction with the mounting tool 100, as opposed to using a stud finder alone to try and find both studs 210 and 212. The stud locator lines 144 can extend over fifteen inches both left and right of the center mark 142. Accordingly, the stud locator lines 144 on the mounting tool 100 can also be used in walls where the studs are spaced apart by twenty-four inches or more.

After finding and marking the locations of the studs 210 and 212 on the template 110, holes 230 (shown in FIG. 2 as holes 230a-230d) are drilled on the mounting hole lines 146a and 146b into the corresponding studs 210 and 212. The projecting member 120 on the mounting tool 100 catches particulates and/or small debris generated while drilling the holes 230a-d. Accordingly, the debris does not fall to the floor or furniture adjacent to the wall 200. After the holes 230a-d are drilled, the mounting tool 100 is removed from the wall 200 and the mounting device is securely attached to the studs 210 and 212. The debris in the receptacle 130 of the projecting member 120 can be discarded and the mounting tool 100 can be used for a subsequent installation or the mounting tool 100 itself can be discarded.

One feature of the mounting tool 100 of the embodiment illustrated in FIGS. 1A-2 is that the projecting member 120 is positioned to catch particulates (e.g., dust and/or small debris) during installation of a mounting device. An advantage of this feature is that it eliminates cleanup and mitigates damage to the surrounding area caused by drilling holes into the wall. For example, an installer who is using the mounting tool 100 to install a flat panel video display in a bedroom of a home will not have to worry about dust and/or debris covering the floor and/or furniture in the room. Thus, the installer can quickly cleanup after installation, resulting in greater efficiency and allowing the installer to perform further installations in a shorter period of time.

Another feature of the mounting tool 100 in the illustrated embodiment is that the alignment indicia 140 on the template 110 provide for accurate placement of the mounting device on the support medium without the need for additional tools or cumbersome measuring and/or leveling processes. For example, the installer can quickly align the center mark 142 of the template 110 with the desired mounting location on the support medium. After using a stud finder to locate a first stud in the support medium, the installer can use the stud locator lines 144 to more accurately locate a center point on a second stud. Finally, the installer can drill pilot holes along the mounting hole lines 146, ensuring that the pilot holes are positioned at the desired locations without the need for additional measurements and/or calculations.

FIG. 3 is a partially schematic isometric view of a mounting device 300 for supporting a flat screen video display (not shown) attached to the wall 200 after the mounting tool 100 (FIG. 2) has been removed from the wall 200. The mounting device 300 is mounted to the wall 200 using lag bolts 310 inserted into the corresponding holes 230a-d. In the illustrated embodiment, the mounting device 300 is the U3 universal plasma mount described above. A different mounting device may be used in other embodiments. After attaching the mounting device 300 to the wall 200, a flat panel video display (not shown) is releasably secured to the mounting device 300.

D. Additional Embodiments of Mounting Tools

Figure 4A:
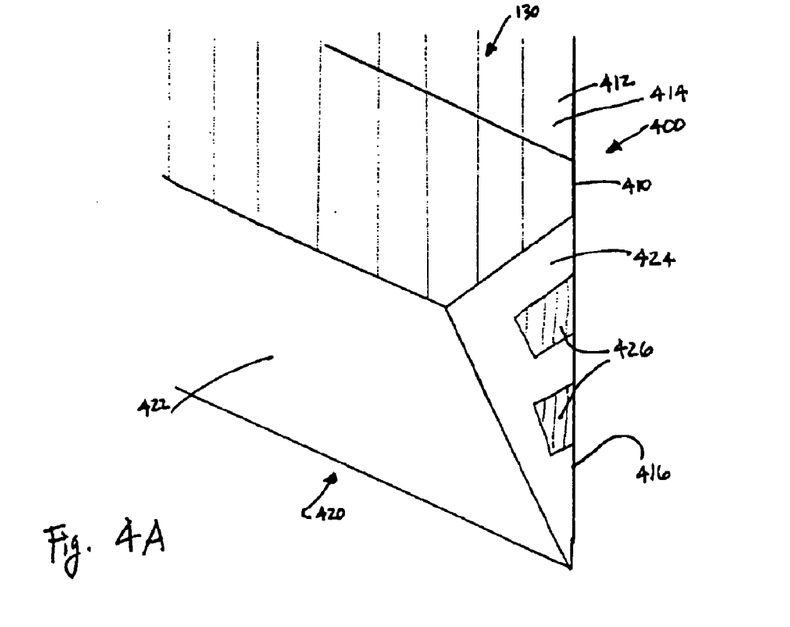
FIG. 4A is an isometric view of a portion of an assembled projecting member of a mounting tool in accordance with another embodiment of the invention.
Figure 4B:
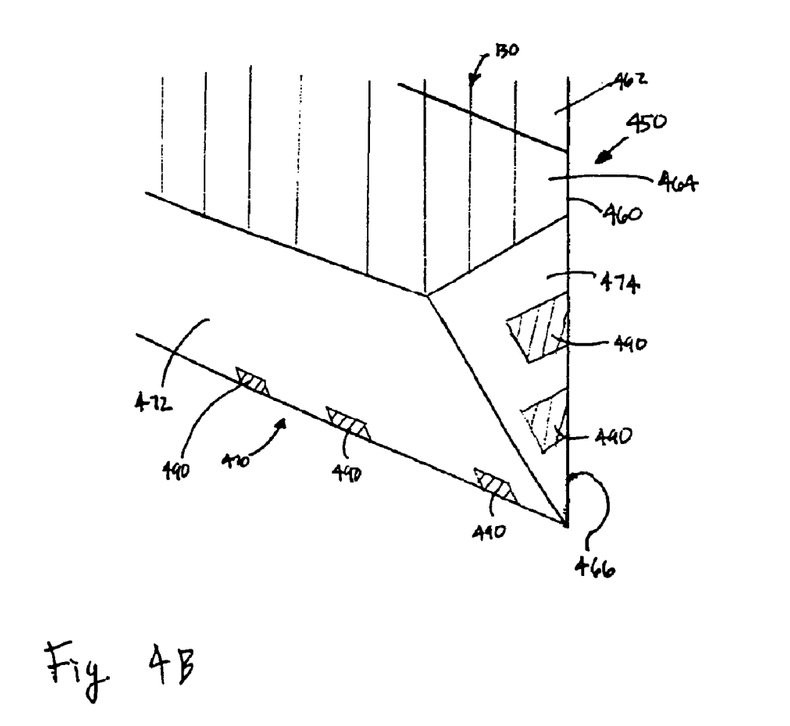
FIG. 4B is an isometric view of a portion of an assembled projecting member of a mounting tool in accordance with another embodiment of the invention.

FIGS. 4A and 4B illustrate several alternative configurations of projecting members for use with mounting tools. In FIGS. 4A and 4B, some of the features may be the same as those discussed above in connection with the mounting tool 100 in FIGS. 1A-1C. Accordingly, like reference numbers are used to refer to like components in FIGS. 1A-1C and FIGS. 4A-4B.

FIG. 4A is an isometric view of a portion of a mounting tool 400 including a projecting member 420 in accordance with another embodiment of the invention. The mounting tool 400 includes a template 410 having a body 412 with a front side 414. The projecting member 420 has a tray portion 422 and tabs 424 (only one tab 424 is shown) operatively coupled to the body 412 of the template 410. The primary difference between the mounting tool 400 in FIG. 4A and the mounting tool 100 described above in FIGS. 1A-1C is that the projecting member 420 does not include the tab/slot arrangement of the mounting tool 100 to hold the projecting member in place. Rather, the projecting member 420 includes a plurality of adhesive strips 426 for attaching the tabs 424 to a backside 416 of the body 412. In the illustrated embodiment, two adhesive strips 422 are shown, but a different number of adhesive strips 422 may be used. In other embodiments, the strips 422 can secure the tabs 424 to the body 412 of the template 410 using different materials (e.g., VELCRO®).

FIG. 4B is an isometric view of a portion of a mounting tool 450 including a projecting member 470 in accordance with another embodiment of the invention. The mounting tool 450 includes a template 460 having a body 462 with a front side 464. The primary difference between the mounting tool 450 in FIG. 4B and the mounting tools described previously is that the projecting member 470 is a discrete component separate from the body 462 that is attached to the body 462 in use. Accordingly, the tray portion 472 and the tabs 474 (only one tab 474 is shown) are not integral with the body 462 of the template 460. Rather, the tray portion 472 and the tabs 474 are fastened to the body 462 of the template 460 using a plurality of adhesive strips 490. The adhesive strips 490 are secured to a backside 466 of the body 462 to hold the projecting member 470 in place. In other embodiments, the projecting member 470 can have different configurations and/or be secured to the body 462 of the template 460 using different methods.

E. Embodiments of Systems for Mounting Video Displays

Figure 5:
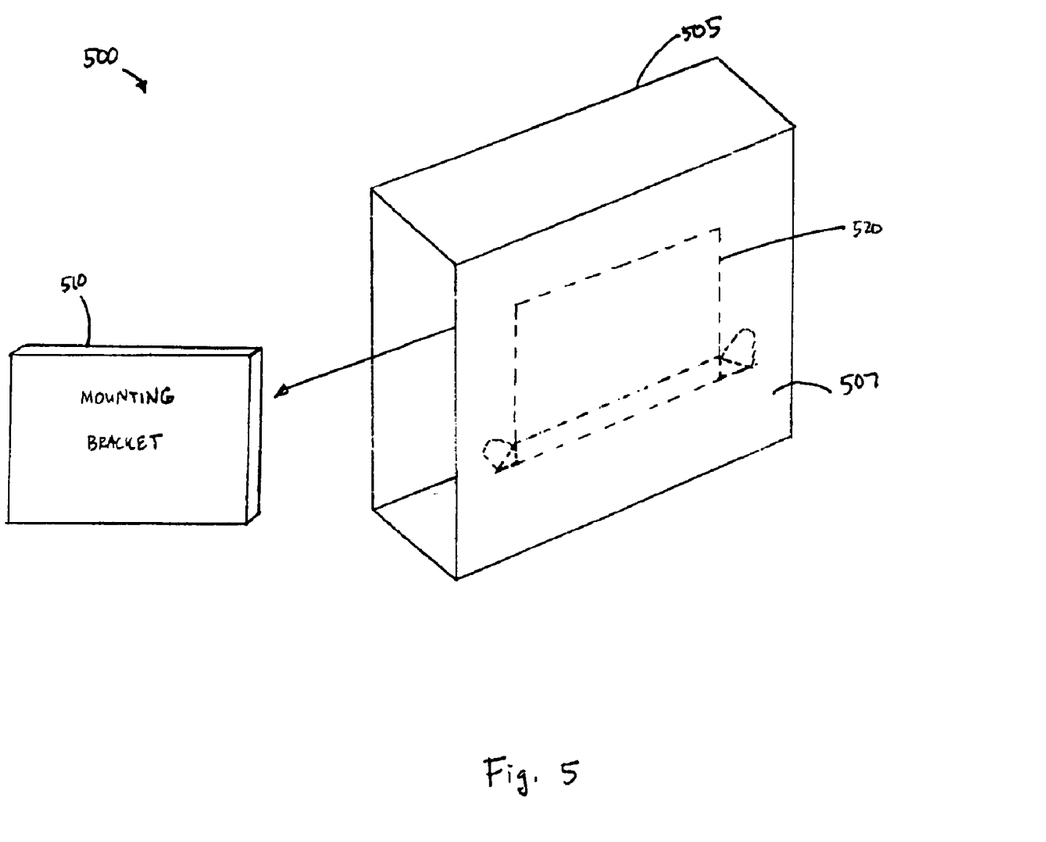
FIG. 5 is a partially schematic isometric view of a system for mounting a flat panel video display to a support medium in accordance with an embodiment of the invention.

FIG. 5 is a partially schematic isometric view of a system 500 for mounting a flat panel video display to a support medium in accordance with an embodiment of the invention. The system 500 includes a mounting bracket 510 (shown schematically) and packaging 505 for the mounting bracket 510. The system 500 further includes a mounting tool 520 (shown in broken lines). The mounting tool 520 can be generally similar to the mounting tool 100 described above with respect to FIGS. 1A-1C.

In the embodiment illustrated in FIG. 5, the mounting tool 520 is integral with the packaging 505 of the mounting bracket 510. After the mounting bracket 510 is removed from the packaging 505, the mounting tool 520 is cut out from a wall 507 of the packaging 505 and used to install the mounting bracket 510, as described above with respect to FIGS. 2-3. The mounting tool 520, however, may be a discrete component separate from the packaging 505 in other embodiments. For example, the mounting tool 520 could be stored within the packaging 505 without being integral with the wall 507 of the packaging 505. In either embodiment, the mounting tool 520 is generally planar before erecting the projecting member so that it occupies little to no space in the packaging. Furthermore, the mounting tool 520 may be provided separately from the mounting bracket 510 and packaging 505. For example, the mounting tool 520 may be sold as a stand-alone component.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A mounting tool for installing a mounting device to support a video display, comprising:
   a template having a body sized to correspond with dimensions of the mounting device and configured to be releasably attachable to a surface on which the mounting device will be mounted; and
   a projecting member configured to interface with the body, the projecting member being movable to project at an angle from the body for catching particulates.

2. The mounting tool of claim 1 wherein:
   the body has a first side and a second side opposite the first side, and wherein the body further includes alignment indicia at the first side and an adhesive at the second side; and
   the projecting member projects outward from the first side in an operating configuration.

3. The mounting tool of claim 2 wherein the projecting member is integral with the body.

4. The mounting tool of claim 2 wherein the projecting member is a discrete component with respect to the body.

5. The mounting tool of claim 2 wherein the template comprises a cardboard body.

6. The mounting tool of claim 2 wherein the template comprises a plastic body.

7. The mounting tool of claim 2 wherein the alignment indicia comprises a center mark, a stud locater, and a mounting hole line indicator.

8. The mounting tool of claim 2, further comprising a plurality of holes in the body, the holes being positioned to view a desired mounting location on the surface on which the mounting device will be mounted while releasably attaching the template to the surface.

9. The mounting tool of claim 2 wherein the template further comprises a removable portion positioned to align corresponding electrical and audio-visual connections on the surface on which the mounting device will be mounted with the mounting device and/or the video display.

10. The mounting tool of claim 2 wherein:
    the projecting member comprises a tray portion, a first tab and a second tab; and
    the body further comprises a first slot and a second slot positioned to receive the first and second tabs, respectively, when the projecting member is in the operating configuration.

11. The mounting tool of claim 2 wherein:
    the projecting member comprises a tray portion and a side portion; and
    the mounting tool further comprises an adhesive strip operatively coupling the tray portion and/or the side portion to the body when the projecting member is in the operating configuration.

12. A mounting tool for installing a mounting device to support a video display, comprising:
a template having a generally planar body sized to correspond with dimensions of the mounting device and having a first side and a second side opposite the first side, the template including alignment indicia at the first side and an adhesive at the second side for releasably attaching the template to a wall on which the mounting device will be mounted; and
a projecting member operatively coupled to the body and movable between a first position and a second position, wherein the projecting member is generally planar with the body in the first position and the projecting member projects transversely from the body in the second position to form a tray for catching particulates.

13. The mounting tool of claim 12 wherein the projecting member is integral with the body.

14. The mounting tool of claim 12 wherein the projecting member is a discrete component with respect to the body.

15. The mounting tool of claim 12 wherein the template comprises a cardboard body.

16. The mounting tool of claim 15 wherein:
the projecting member comprises a tray portion, a first tab and a second tab; and
the body further comprises a first slot and a second slot positioned to receive the first and second tabs, respectively.

17. The mounting tool of claim 15 wherein:
the projecting member comprises a tray portion and a side portion; and
the mounting tool further comprises an adhesive strip operatively coupling the tray portion and/or the side portion to the body.

18. The mounting tool of claim 12 wherein the template further comprises a removable portion positioned to align corresponding electrical and audio-visual connections on the support medium with the mounting device and/or video display.

19. A mounting tool for installing a mounting device to support a video display, comprising:
a template having a body sized to correspond with dimensions of the mounting device and including securement means for releasably attaching the template to a surface on which the mounting device will be mounted; and
collection means operatively attachable to the body and movable to a configuration for capturing particulates.

20. The mounting tool of claim 19 wherein the collection means is a projecting member integral with the body.

21. The mounting tool of claim 19 wherein the collection means is a projecting member that is a discrete component with respect to the body.

22. The mounting tool of claim 19 wherein the securement means includes an adhesive strip on the body.

23. A system for mounting a video display, comprising:
a mounting tool including a template having a body configured to be releasably attachable to a support medium and a projecting member configured to interface with the body for catching particulates; and
a mounting bracket for releasably supporting a video display on the support medium, wherein the template body is sized to correspond with dimensions of the mounting bracket.

24. The system of claim 23 wherein the template comprises a cardboard body.

25. The system of claim 23 wherein the template comprises a plastic body.

26. The system of claim 23 wherein the template comprises a cardboard body, and wherein the template is integral with the packaging for the mounting bracket.

27. The system of claim 23 wherein the projecting member is integral with the body.

28. The system of claim 23 wherein the projecting member is a discrete component with respect to the body.

29. The system of claim 23 wherein the mounting bracket is a universal mounting bracket sized to fit a variety of video displays.

30. A system for mounting a video display, comprising:
a mounting tool including a template having a generally planar body with a first side and a second side opposite the first side, the template including alignment indicia at the first side and an adhesive portion at the second side for releasably attaching the template to a wall, wherein the mounting tool further includes a projecting member operatively coupled to the body and movable between a first position and a second position, and wherein the projecting member is generally planar with the body in the first position and the projecting member projects transversely from the body in the second position to form a tray for catching particulates; and
a mounting bracket for releasably supporting a video display on the wall wherein the template body is sized to correspond with dimensions of the mounting bracket.

31. A method of installing a mounting device for supporting a video display, comprising:
releasably attaching a body of a mounting tool to a desired location on a support medium, wherein at least a portion of the body is aligned with a stud in the support medium;
drilling mounting holes in the support medium aligned with corresponding portions of the body;
catching particulates in a projecting member of the mounting tool that projects from the body while drilling the mounting holes;
aligning a mounting bracket with corresponding mounting holes and attaching the mounting bracket to the support medium, wherein the body of the mounting tool is sized to correspond with dimensions of the mounting bracket.

32. The method of claim 31, further comprising:
aligning a mounting bracket with corresponding mounting holes and attaching the mounting bracket to the support medium; and
attaching a video display to the mounting bracket.

33. The method of claim 31 further comprising assembling the projecting member with the body before releasably attaching the body to the support medium.

34. The method of claim 31 wherein drilling the mounting holes comprises drilling holes along a mounting hole line on the mounting tool into the stud in the support medium.

35. The method of claim 31 wherein the body is aligned with a first stud in the support medium, and wherein the method further comprises using alignment indicia on the mounting tool to find a second stud in the support medium.

36. The method of claim 31, further comprising:
folding the projecting member relative to the body so the projecting member is transverse to the body; and
securing the projecting member in the transverse position.

* * * * *